United States Patent [19]

Hiramatsu et al.

[11] Patent Number: 4,813,307
[45] Date of Patent: Mar. 21, 1989

[54] METHOD OF CONTROLLING HYDRAULIC PRESSURE FOR AN AUTOMATIC TRANSMISSION GEAR SYSTEM

[75] Inventors: Takeo Hiramatsu; Bonnosuke Takamiya; Yuichi Tanaka, all of Kogyo, Japan

[73] Assignee: Mitsubishi Jidosha Kogyo Kabushiki Kaisha, Japan

[21] Appl. No.: 67,624

[22] Filed: Jun. 26, 1987

Related U.S. Application Data

[63] Continuation of Ser. No. 721,285, Apr. 9, 1985, abandoned.

[30] Foreign Application Priority Data

Apr. 10, 1984 [JP] Japan .................................. 59-69926
Apr. 26, 1984 [JP] Japan .................................. 59-82864

[51] Int. Cl.$^4$ ............................................. B60K 41/04
[52] U.S. Cl. ............................... 74/866; 74/861; 74/867; 364/424.1
[58] Field of Search ............... 74/861, 866, 867, 868, 74/869, 752 A; 364/424.1

[56] References Cited

U.S. PATENT DOCUMENTS

| | | | |
|---|---|---|---|
| 4,020,718 | 5/1977 | Miyauchi et al. | 74/869 |
| 4,094,211 | 6/1978 | Espenschied | 74/868 |
| 4,301,697 | 11/1981 | Iwanaga et al. | 74/861 X |
| 4,367,528 | 1/1983 | Kawamoto et al. | 74/866 X |
| 4,419,909 | 12/1983 | Opperud et al. | 74/866 |
| 4,506,563 | 3/1985 | Hiramatsu | 74/867 |
| 4,513,639 | 4/1985 | Hiramatsu | 74/866 |
| 4,519,273 | 5/1985 | Shimizu et al. | 74/867 X |
| 4,534,244 | 8/1985 | Hiramatsu | 74/867 X |
| 4,558,612 | 12/1985 | Shimizu et al. | 74/886 X |
| 4,573,375 | 3/1986 | Hamada et al. | 74/866 X |

Primary Examiner—Dirk Wright
Assistant Examiner—David Novais
Attorney, Agent, or Firm—Abelman, Frayne, Rezac & Schwab

[57] ABSTRACT

A method of controlling the hydraulic pressure for an automatic transmission gear system, in which the actual rotation speed of a rotatable element during a speed shift from, for example, the 1st speed ratio to the 2nd speed ratio is detected, and the hydraulic pressure supplied to a frictional engaging element acting to change the rotation speed of the rotatable element is controlled so that the rate of change of the rotation speed of the rotatable element can converge to a predetermined change rate when the speed change rate due to the speed shift is ideal. On the other basis of the hydraulic pressure supplied to the frictional engaging element in the final state of the speed shift, the initial hydraulic pressure to be supplied to the frictional engaging element immediately after starting of the next speed shift is computed. Such a trial is repeated a plurality of times so that an automatic transmission whose operating hydraulic pressure is not primarily designed to meet the operation of an engine from the aspect of the capacity can be adapted to operate with the engine.

7 Claims, 5 Drawing Sheets

METHOD OF CONTROLLING HYDRAULIC PRESSURE FOR AN AUTOMATIC TRANSMISSION GEAR SYSTEM

This is a continuation of application Ser. No. 721,285 filed on Apr. 9, 1985 now abandoned.

BACKGROUND OF THE INVENTION

This invention relates to an automatic transmission for an automative vehicle having a feedback control function for supplying an adequate hydraulic pressure to frictional engaging elements of the automatic transmission during a shift from one speed ratio to another. More particularly, the present invention relates to a method of automatically correcting the initial hydraulic pressure to set it at a suitable value to be supplied to the frictional engaging elements of the automatic transmission even when the engine of the vehicle is replaced by another of different capacity such as an output torque or displacement different from that of the former.

In general, an automatic transmission for an automative vehicle includes frictional engaging elements such as clutches and brakes which are selectively actuated by the application of hydraulic pressure to stop rotation of a selected one of a plurality of rotary elements relative to another, or connect or disconnect the rotary element from an input shaft, thereby automatically changing over or shifting the speed ratio depending on the operating condition of the vehicle. In order to protect the automatic transmission against damage and to ensure a comfortable ride for occupants of the vehicle, the hydraulic pressure supplied to the frictional engaging elements of the automatic transmission is controlled gradually along a predetermined characteristics curve from the value of the initial hydraulic pressure supplied immediately after a shift, to a value corresponding with another speed ratio.

Nowaday, a variety of kinds of vehicles are sold on the market to meet a variety of needs, and a variety of kinds of engines are furnished to be mounted on such vehicles. However, due to the fact that the initial hydraulic pressure described above differs depending on the factor such as the displacement and/or output torque of engines mounted on vehicles, a variety of kinds of automatic transmissions must also be prepared to meet the variety of kinds of the engines. Suppose, for example, the case in which an automatic transmission adapted to be combined with an engine having a relatively large displacement is combined with an engine having a relatively small displacement. In such a case, since the operating hydraulic pressure (line pressure) of the automatic transmission adapted to be combined with a large-displacement engine is primarily high compared with that of the automatic transmission adapted to be combined with the small-displacement engine, the engaging force of the frictional engaging elements will become excessively large compared with the output torque of the engine, and the frictional engaging elements will be engaged by the initial hydraulic pressure as soon as a shift starting signal is generated, resulting in impactation of a great shift shock. In a converse case, on the other hand, the line pressure will be too low to start a speed shift or a large length of time will be required to attain the speed shift. Thus, it has been impossible to apply an automatic transmission of single capacity to an engine other than those of predetermined capacity.

Therefore, automatic transmission of a small number had to be manufactured for each of a variety of kinds, resulting in increased production costs and troublesome production control.

SUMMARY OF THE INVENTION

With a view to improve such a prior art situation, it is a primary object of the present invention to provide, in connection with an automatic transmission having a feed back control function so as to supply an appropriate hydraulic pressure to frictional engaging elements during a shift from one speed ratio to another, a method of setting the initial hydraulic pressure to meet any one of a variety of kinds of engine, thereby realizing the desired application of the automatic transmission of single capacity, to any one of engines of various capacities, vehicle, as the same time, reducing the production costs and simplifying the production control.

In accordance with the present invention which attains the above object, there is provided a method of controlling hydraulic pressure for an automatic transmission gear system having, an input shaft coupled to an internal combustion engine, an output shaft coupled to driving wheels, a speed change gear assembly connecting said input shaft and said output shaft and adapted to be coupled to provide various ratios between the input shaft and the output shaft rotation, plural frictional engaging elements for effecting changes in the ratios, detecting means which detects rotation speed of a rotatable element that changes its rotation speed during a shift from one ratio to another, a control device which controls hydraulic pressure supplied to one of said plural frictional engaging elements to be engaged to converge changing rate of the rotation speed of said rotatable element to a predetermined reference rate during the shift, wherein a value of initial hydraulic pressure to be supplied, just after start of a next shift, to said one of plural frictional engaging elements is decided from a value of terminative hydraulic pressure supplied to said one of plural frictional engaging elements at a time when the rotation speed of the rotatable element becomes a predetermined value in a final state of a current shift.

DESCRIPTION OF THE PREFERRED EMBODIMENTS

Preferred embodiments of the present invention will now be described with reference to the drawings.

Before describing the present invention in detail, an example of an automatic transmission to which the present invention is applied will be described with reference to FIG. 1 which shows schematically the structure of such an automatic transmission.

It is supposed herein that an automatic transmission adapted to be combined with a large-displacement engine is combined with a small-displacement engine so as to illustrate clearly the effect of the method according to the present invention.

Figure 1:
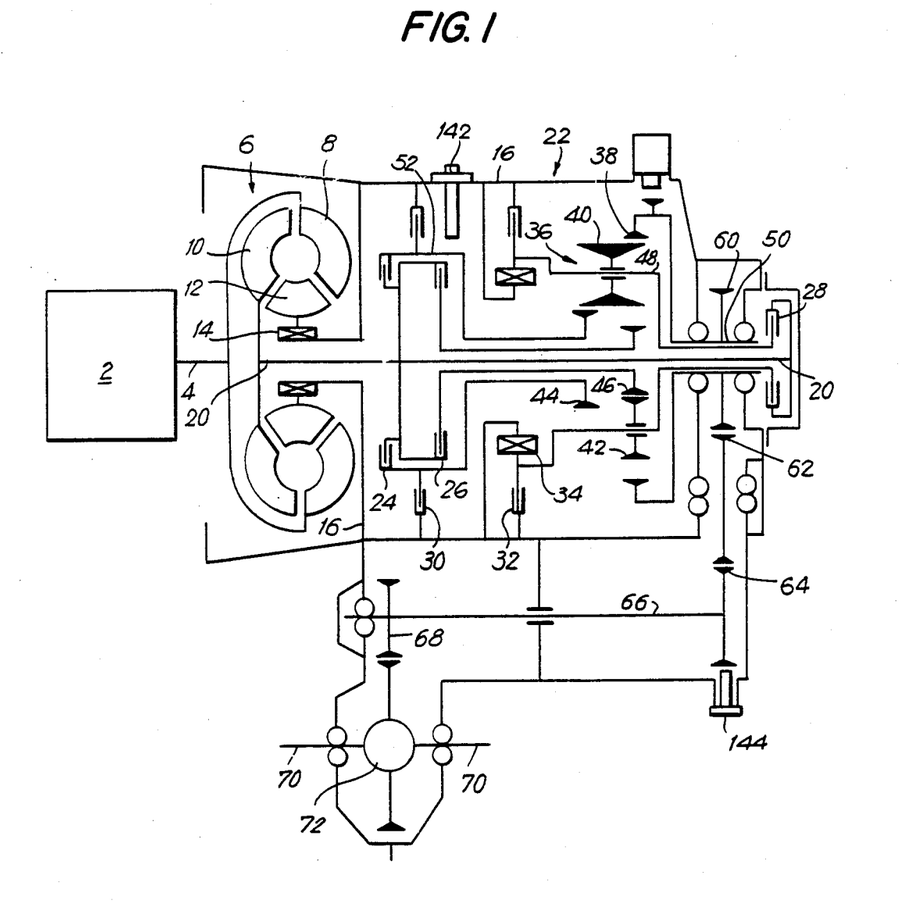
FIG. 1 shows schematically the structure of the power transmitting part of an automatic transmission to which the present invention is applied.

Referring now to FIG. 1, the engine 2 providing a power source for driving a vehicle is directly coupled at its crankshaft 4 to a pump 8 of a torque converter 6. The torque converter 6 includes the pump 8, a turbine 10, a stator 12 and a one way clutch 14. The stator 12 is coupled to a casing 16 through the one-way clutch 14. The stator 12 is so arranged that it can rotate in the same direction as the crankshaft 4 but is not permitted to rotate in the reverse direction by the function of the one-way clutch 14.

The torque transmitted to the turbine 10 is then transmitted by an input shaft 20 to a speed change gear assembly 22 which is disposed behind the torque converter 6 and which provides four forward speeds and one reverse speed.

The speed change gear assembly 22 includes three clutches 24, 26, 28, two brakes 30, 32, one one-way clutch 34, and one ravigneaux type planetary gear set 36. The planetary gear set 36 includes a ring gear 38, a long pinion gear 40, a short pinion gear 42, a front sun gear 44, a rear sun gear 46, and a carrier 48. The carrier 48 rotatably supports the two pinion gears 40 and 42 and is also rotatable around its own axis. The ring gear 38 is coupled to an output shaft 50, and the front sun gear 44 is coupled to the input shaft 20 through a kickdown drum 52 and the front clutch 24. The rear sun gear 46 is coupled to the input shaft 20 through the rear clutch 26. The carrier 48 is fixedly coupled to the casing 16 through the low reverse brake 32 and the one-way clutch 34 which are arranged to be functionally parallel to each other. The carrier 48 is also coupled to the input shaft 20 through the 4th speed clutch 28 disposed in the rear end of the speed change gear assembly 22. The kickdown drum 52 can be fixedly coupled to the casing 16 by the kickdown brake 30. The torque transmitted through the planetary gear set 36 is transmitted from an output gear 60 fixed to the output shaft 50 to a driven gear 64 via an idle gear 62, and, thence, transmitted via a transfer shaft 66 to which the driven gear 64 is fixed and via a helical gear 68 to a differential gear unit 72 to which a driving shaft 70 driving the driving wheel is coupled.

Figure 2:
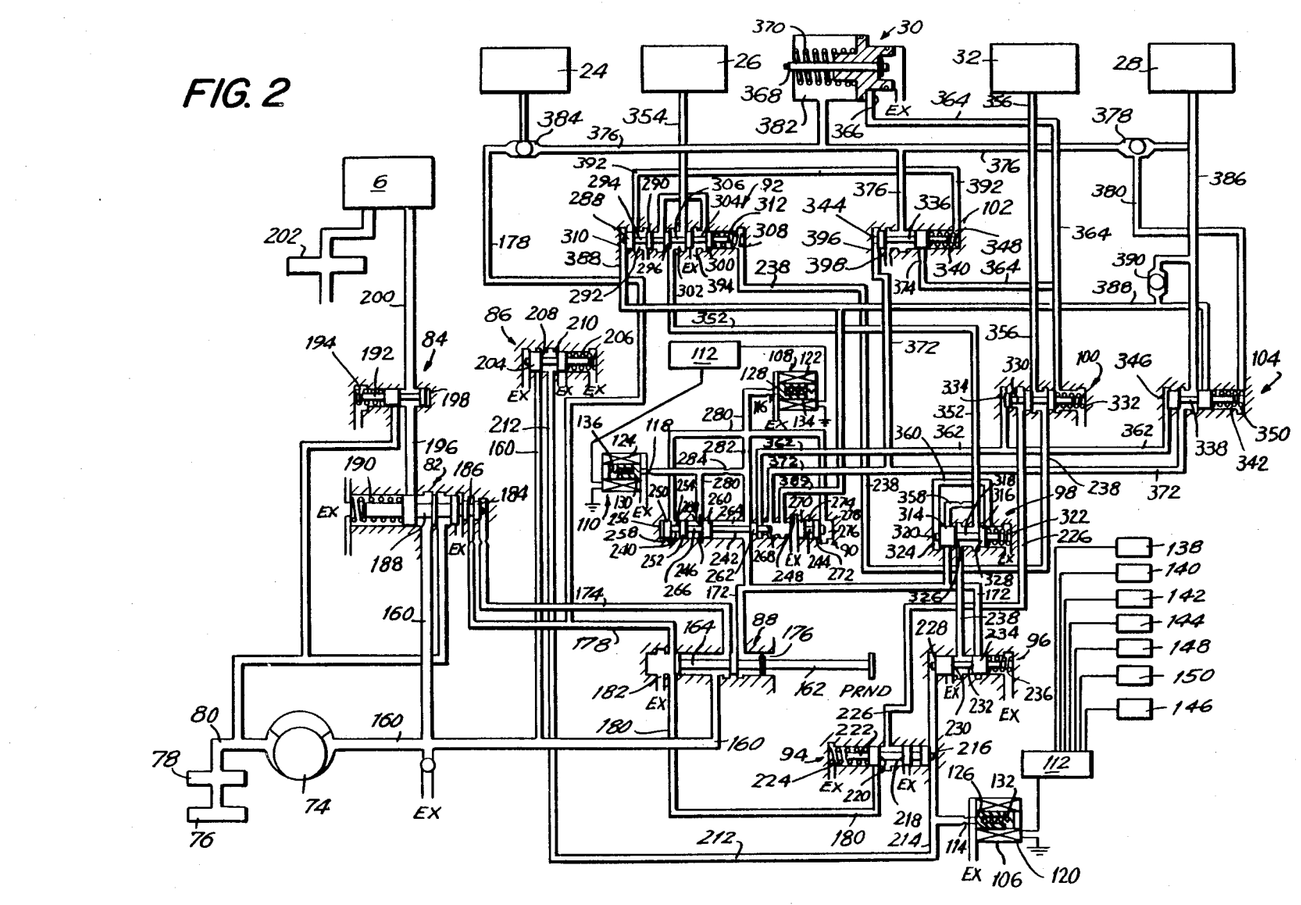
FIG. 2 shows diagrammatically the structure of the hydraulic pressure control part of the automatic transmission shown in FIG. 1.

The frictional engaging elements or the individual clutch and brakes described above are in the form of frictional engaging devices including engaging piston units, servo units or the like respectively and are actuated by a hydraulic pressure generated at an oil pump 74 which is shown in FIG. 2. This oil pump 74 is driven from the engine 2 through the pump 8 of the torque converter 6. The hydraulic pressure is selectively supplied, under control of a hydraulic pressure control system, described later, to the individual clutches and brakes depending on the driving condition of the vehicle detected by various driving condition detectors or sensors, so that combinations of the operations of the individual clutches and brakes achieve speed ratios of four forward speeds and reverse speed shown in Table 1. In the table, the symbol o indicates that the corresponding clutch or brake is engaged, while the symbol ⊚ indicates that the rotation of the carrier 48 is locked by the function of the one-way clutch 34 immediately before the low reverse brake 32 is engaged for shifting operation.

TABLE 1

| Frictional engaging element | Speed | | | | | |
|---|---|---|---|---|---|---|
| | 1st | 2nd | 3rd | 4th | R | N.P |
| Front cluth 24 | | | o | | o | |
| Rear clutch 26 | o | o | o | | | |
| Kickdown brake 34 | | o | | o | | |
| Low reverse brake 35 | o | | | | o | |
| One-way clutch 34 | ⊚ | | | | | |
| 4th speed clutch 28 | | | | o | | |

The hydraulic pressure control system provided for achieving the speed ratios shown in table 1 in the speed change gear assembly 22 shown in FIG. 1 will now be described.

The hydraulic pressure discharged from the oil pump 74 flows through an oil filter 78 and a fluid passage 80 to be supplied to the torque converter 6 and to individual fluid chambers of the piston units or servo units of the clutches 24, 26, 28 and brakes 30, 32 of the speed change gear assembly 22. The hydraulic pressure control system shown in FIG. 2 controls the hydraulic pressure supplied to the fluid chambers depending on the driving condition of the vehicle. The hydraulic pressure control system includes, as its principal components, a pressure regulating valve 82, a torque converter control valve 84, a pressure reducing valve 86, a manual valve 88, a shift control valve 90, a rear clutch control valve 92, an N-R control valve 94, a hydraulic pressure control valve 96 for speed shifting, an N-D control valve 98, a 1st-2nd speed shift valve 100, a 2nd-3rd speed and 4th speed shift valve 102, a 4th clutch control valve 104, and three electromagnetic valve 106, 108, and 110. These components are connected to one another by fluid passage. The shift control valve 90, the 1st-2nd speed shift valve 100, the 2nd-3rd and 4th-3rd speed shift valve 102 and the 4th clutch control valve 104 function as change-over valves changing over the fluid passages leading to the individual frictional engaging elements 24, 26, 28, 30 and 32 among these components thereby changing over the speed ratios. The hydraulic pressure control valve 96, the N-R control valve 94 and the electromagnetic valve 106 controlling the hydraulic pressure supplied to the individual frictional engaging elements are controlled by an electronic control device 112.

The electromagnetic valves 106, 108, and 110 have the same structure and are of the type closed when de-energized, for effecting open-close control of associated orifices 114, 116 and 118 in response to an electrical signal applied from the electronic control device 112. The electromagnetic valves 106, 108 and 110 include coils 120, 122, 124, valve members 126, 128, 130 disposed in the coils for opening and closing the orifices 114, 116, 118, and springs 132, 134, 136 normally urging the valve members in the closing direction, respectively.

The electronic control device 112 contains units such as a driving condition determination unit detecting the driving condition of the vehicle and determining the open-close combination of the electromagnetic valves 108, 110 and a shift detection unit detecting starting of a speed shift. Said device 112 controls on-off of the duty-controlled electromagnetic valve 106 and also the hydraulic pressure by controlling the valve open period in one cycle by varying the single pulse width of the pulse current of 50 Hz supplied to the electromagnetic valve 106. Said device 112 controls the opening/closing of the electromagnetic valves 108 and 110. Input elements applying inputs to the electronic control device 112 include an engine load sensor 138 detecting the opening of the throttle valve (not shown) of the engine 2, a rotation speed sensor 140 detecting the rotation speed of the engine 2, another rotation speed sensor 142 detecting the rotation speed of the kickdown drum 52 shown in FIG. 1, another rotation speed sensor 144 detecting the rotation speed of the driven gear 64 thereby detecting the rotation speed of the output shaft 50 corresponding to the vehicle speed, an oil temperature sensor 146 detecting the temperature of lubricating oil, a position sensor 148 detecting the selected position of the selector lever, and another position sensor 150 detecting the selected position of an auxiliary switch provided for selection of the forward shift range.

Figure 3A:
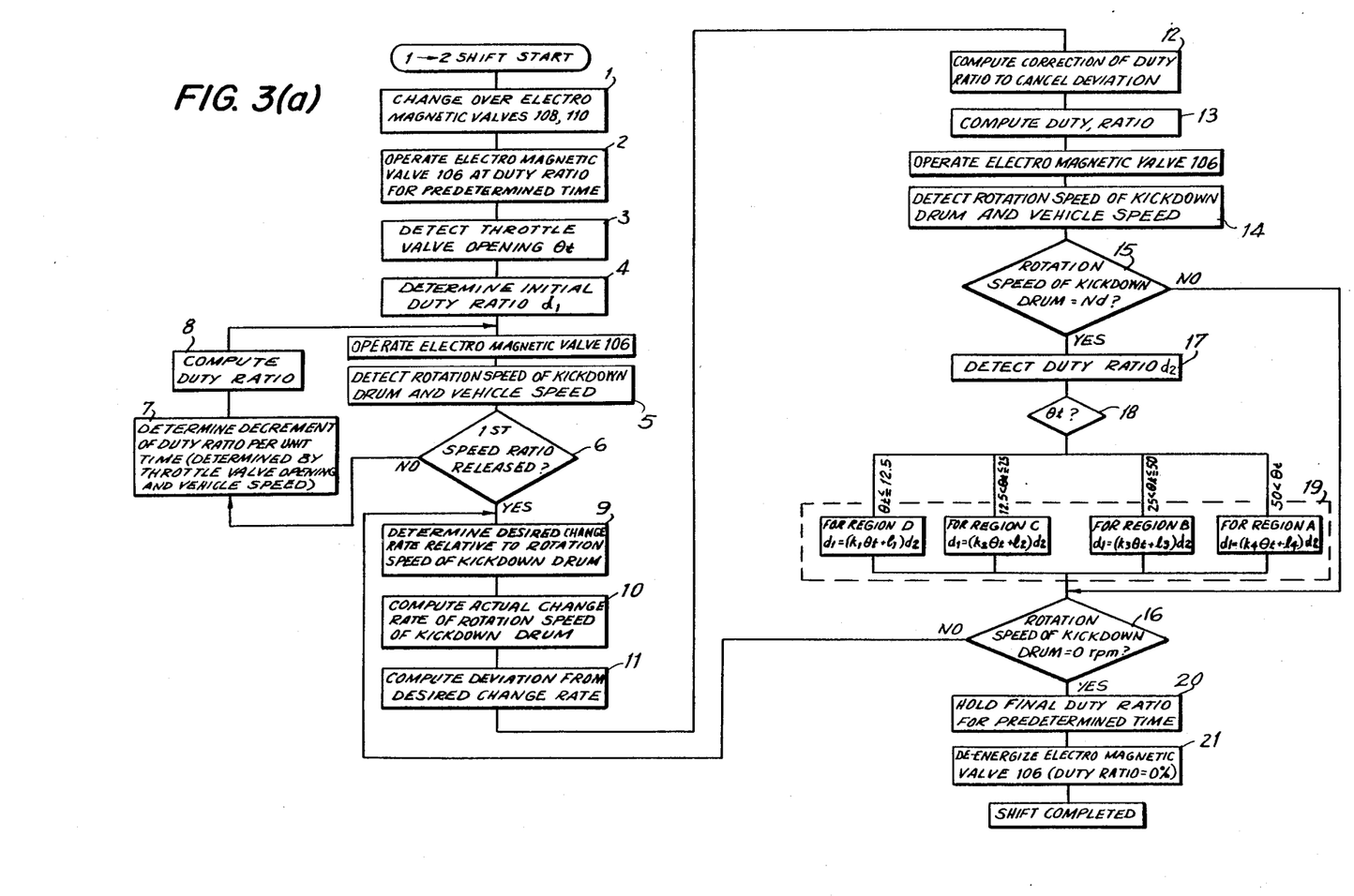
FIG. 3(a) is a flow chart of an embodiment of the method according to the present invention.

The electronic control device 112 is designed to operate according to a flow chart as shown in FIG. 3 so that, on the basis of the results of detection by the sensor described above, the initial hydraulic pressure to be supplied to the frictional engaging elements 24, 26, 28, 30, and 32 immediately after starting of a speed shift can be suitably set and the feedback control of the supplied hydraulic pressure can be carried out as described later.

Pressurized oil discharge from the oil pump 74 is supplied to the pressure regulating valve 82, the manual valve 88 and the pressure reducing valve 86 via a fluid passage 160.

The manual valve 88 has four positions, i.e. D, N, R and P positions. When the D position is selected, the fluid passage 160 communicates with fluid passage 172 and 174 so that the speed change gear assembly 22 can achieve the 1st to 4th forward speed ratios depending on the on-off combination of the electromagnetic valves 108 and 110 as shown in Table 2. At the N position, the fluid passage 160 communicates with the fluid passage 174 only, and the fluid passage 172 communicates with an oil outlet port 176, so that the neutral state is established in the speed change gear assembly 22. At the R position, the fluid passage 160 communicates with fluid passage 178 and 180 so that the rearward speed ratio can be established in the speed change gear assembly 22. At the P position, all the fluid passage communicating with the manual valve 88 communicate now with the oil outlet port 176 or 182 so that the speed change gear assembly 22 is placed substantially in a neutral state.

TABLE 2

| Speed ratio | Electromagnetic valve 108 | Electromagnetic valve 110 |
| --- | --- | --- |
| 1st | ON | ON |
| 2nd | OFF | ON |
| 3rd | OFF | OFF |
| 4th | ON | OFF |

The pressure regulating valve 82 includes a spool 188 having pressure receiving surfaces 184, 186, and a spring 188. When the hydraulic pressure supplied from the fluid passage 160 through the fluid passage 174 acts upon the pressure receiving surfaces 184, the hydraulic pressure in the fluid passage 160 is regulated to a predetermined constant value which will be referred to hereinafter as a line pressure. On the other hand, when the hydraulic pressure supplied from the fluid passage 160 through the fluid passage 178 acts upon the pressure receiving surface 186, the hydraulic pressure in the fluid passage 160 is regulated to another predetermined value.

The torque converter control valve 84 includes a spool 192 and a spring 194, and hydraulic pressure is supplied from the pressure regulating valve 82 via a fluid passage 196. By the balance between the hydraulic pressure acting on the right-hand pressure receiving surface of the spool 192 by flowing through a fluid passage 198 formed on the spool 192 and the biasing force of the spring 194, the hydraulic pressure is regulated to a predetermined value to be supplied to the torque converter 6 via a fluid passage 200. Oil discharged from the torque converter 6 is supplied through an oil cooler 202 to various lubricating parts of the speed change gear assembly 22.

The pressure reducing valve 86 includes a spool 204 and a spring 206. By the balance between the hydraulic pressure due to the area difference between opposing pressure receiving surfaces 208 and 210 formed on the spool 204 and the biasing force of the spring 206, the hydraulic pressure from the fluid passage 160 is reduced and regulated to a predetermined value to be supplied into a fluid passage 212. The regulated hydraulic pressure (reduced hydraulic pressure) is supplied from the fluid passage 212 to the N-R control valve 94, the hydraulic pressure control valve 96 and the orifice 114 of the electromagnetic valve 106 via an orifice 214.

The N-R control valve 94 includes a spool 222 formed with pressure receiving surfaces 216, 218, 220, and a spring 224. By the balance between the hydraulic pressure acting on the pressure receiving surface 216 and the combination of the hydraulic pressure due to the area difference between the pressure receiving surfaces 218, 220 and the biasing force of the spring 224, the hydraulic pressure in a fluid passage 226 is regulated to a predetermined value.

The hydraulic pressure control valve 96 includes a spool 234 formed with pressure receiving surfaces 228, 230, 232, and a spring 236. By the balance between the hydraulic pressure acting on the pressure receiving surface 228 and the combination of the hydraulic pressure due to the area difference between the pressure receiving surfaces 230, 232 and the biasing force of the spring 236, the hydraulic pressure in a fluid passage 238 is regulated to a predetermined value.

The hydraulic pressure thus regulated and supplied to the fluid passage 226 controls the low reverse brake 32 at the time of shifting to the reverse speed ratio. The hydraulic pressure regulated and supplied to the fluid passage 238 controls the front clutch 24, the rear clutch 26, the kickdown brake 30 and the low reverse brake 32 when the vehicle is in the forward driving condition or is halted.

The electromagnetic valve 106 is duty-controlled by the electronic control device 112. The ratio of opening and closure of the orifice 114 is changed by changing the proportion of the pulse width in one cycle of a constant-frequency pulse current (referred to hereinafter as a duty ratio) so as to control the value of the signal hydraulic pressure in a fluid passage 212 downstream of the orifice 214, that is to control the hydraulic pressure acting on the pressure receiving surface 216 of the N-R control valve 94 and on the pressure receiving surface 228 of the hydraulic pressure control valve 96. Thus, by varying the signal hydraulic pressure, the value of the hydraulic pressure supplied to the individual frictional engaging elements is controlled. Therefore, the signal hydraulic pressure described above is regulated on the basis of the relation between the diameter of the orifice 214 and that of the orifice 114, and as a result, the regulated hydraulic pressure generated in the fluid passages 226 and 238 (the hydraulic pressure in the fluid passage 180 or 172) increases or decreases in a relation proportional to the increase or decrease in the signal hydraulic pressure.

However, the hydraulic pressure in the fluid passages 226 and 238 increases or decreases in a relation inversely proportional to the increase or decrease of the duty ratio.

The operation starting timing and operating duration of the electromagnetic valve 106 is determined by the electrical signals applied from the means such as the shift sensor incorporated in the electronic control device 112 for detecting the starting of a speed shift and those included in the flow chart shown in FIG. 3, besides those applied from the engine load sensor 138 and various rotation speed sensors 140, 142 and 144.

The shift control valve 90 is controlled by the combination of the on-off states of the electromagnetic valves 108 and 110. The shift control valve 90 includes three spools 240, 242, 244 and two stoppers 246, 248. The spool 240 is formed with lands 250 and 252, an annular groove 254, and a fluid passage 258 through which the annular groove 254 communicates with a fluid chamber 256 on the left-hand side of the land 250. The spool 242 is formed with lands 260 and 262 of different diameters, an annular groove 264, and pressing portions 266 and 268 engageable with the spools 240 and 244 respectively. The spool 244 is formed with lands 270 and 272, an annular groove 274, and a fluid passage 278 through which the annular groove 274 communicates with a fluid chamber 274 on the right-hand side of the land 272. The stopper 246 is interposed between the spools 240 and 242 and is fixed to the casing.

The stopper 248 is interposed between the spools 242 and 244 and is fixed to the casing. The fluid passage 172 communicates always with a fluid passage 280 through the annular groove 264. This fluid passage 280 communicates through an orifice 282 with the orifice 116, the left-hand fluid chamber 256 and the right-hand fluid chamber 276 and communicates also through an orifice 284 with the orifice 118 and a fluid chamber 286 defined between the spools 240 and 242.

The rear clutch control valve 92 includes a spool 294 formed with a land 288, another land 290 having a diameter smaller than that of the land 288, and on annular groove 292; a spool 306 formed with three lands 296, 298 and 300 having the same diameter as that of the land 290, and annular grooves 302 and 304; and a spring 308. When the pressing force of the hydraulic pressure introduced into a left-hand fluid chamber 310 in FIG. 2 to act on the pressure receiving surface of the land 288 exceeds the combination of the pressing force of the hydraulic pressure introduced into a right-hand fluid chamber 312 in FIG. 2 to act on the pressure receiving surface of the land 300 and the biasing force of the spring 308, the two spools 294 and 306 are urged to their rightmost positions in FIG. 2. When the spools 294 and 306 are brought to such positions, the hydraulic pressure acts between the lands 290 and 296, so that, when the hydraulic pressure in the fluid chamber 310 is then discharged, the spool 294 alone is urged leftward in FIG. 2.

Thereafter, the spool 306 is urged leftward when the pressing farce of the hydraulic pressure acting on the left-hand pressure receiving surface of the land 296 becomes smaller than the combination of the pressing force of the hydraulic pressure in the fluid chamber 312 and the biasing force of the spring 308.

The N-D control valve 98 includes a spool 320 formed with lands 314 and 316, and an annular groove 318, and a spring 322. Depending on the direction of the combination force of the hydraulic pressure acting on the pressure receiving surfaces 324, 326 and 328 and the biasing force of the spring 322, the spool 320 is selectively changed over between the leftmost position shown in FIG. 2 and the rightmost position (not shown).

The 1st-2nd speed shift valve 100 includes a spool 330 and a spring 332. Depending on whether or not the line pressure acts on a left-hand pressure receiving surface 334 of the spool 330, the spool 330 is changed over between the leftmost position shown in FIG. 2 and the rightmost position (not shown). Thus, when the line pressure is supplied to act on the pressure receiving surface 334, the spool 330 is urged to its rightmost position by the force of the line pressure, while, when the line pressure is exhausted, the spool 330 is urged to its leftmost position by the biasing force of the spring 332.

The 2nd-3rd and 4th-3rd speed shift valve 102 and the 4th speed clutch valve 104 similarly include spools 336 and 338, and springs 340 and 342, respectively. Fluid chambers 344 and 346 into which the line pressure is introduced are formed on the left-hand side of the spools 336 and 338 respectively, and fluid chambers 348 and 350 are formed on the right-hand side of the spools 336 and 338 respectively. In each of the valves 102 and 104, the spool is selectively changed over between the leftmost position shown in FIG. 2 and the rightmost position (not shown).

Now, the operation of the automatic transmission having the aforementioned construction will be described together with how to set the initial hydraulic pressure during a speed shift according to the present invention. The manner of shift control in an automatic transmission having a construction similar to that described above is disclosed in detail in Ser. No. 421,311 filed Sept. 22, 1982 now U.S. Pat. No. 4,506,563, and the method of the present invention is similar in the manner of individual speed shifts. Therefore, a speed shift from the 1st speed ratio to the 2nd speed ratio will only be described by way of example, and other speed shifts will not be especially described herein.

In the state in which the 1st speed ratio is attained, both of the electromagnetic valves 108 and 110 are in their energized state, and the line pressure supplied from the fluid passage 160 to the fluid passage 172 through the manual valve 88 is introduced into the fluid chamber of the rear clutch 26 through the hydraulic pressure control valve 96, a fluid passage 238, the N-D control valve 98, a fluid passage 352, the rear clutch control valve 92 and a fluid passage 354. On the other hand, the line pressure supplied from the branch of the fluid passage 238 is introduced into the fluid chamber of the low reverse brake 32 through the 1st-2nd speed shift valve 100 and a fluid passage 356. Therefore, both the rear clutch 26 and the low reverse brake 32 are now engaged.

When the accelerator pedal is further depressed in such a state to increase the speed of the vehicle, a shift starting signal generated from the electronic control device 112 is applied to the electromagnetic valves 108 and 110, with the result that the electromagnetic valve 108 is de-energized, while the electromagnetic valve 110 remains energized.

As a result, the spool 240 of the shift control valve 90 is moved together with the spool 242 rightward in FIG. 2 until the movement of the spool 240 is stopped by abutting on the stopper 246. The line pressure in the fluid passage 172 is introduced into a fluid passage 362 through the space between the two lands 260 and 262 of the spool 242, and the line pressure acts on the pressure receiving surface 334 of the 1st–2nd speed shift valve 100 to urge the spool 330 toward the rightmost position in FIG. 2. Consequently, the line pressure introduced into the 1st–2nd speed shift valve 100 via the fluid passage 238 is supplied to the engaging-side fluid chamber 366 of the kickdown brake 30 through a fluid passage 364. The rod 368 is urged leftward in FIG. 2 against the force of the spring 370 thereby causing engagement of the brake band (not shown) with the kickdown drum 52, while, the hydraulic pressure in a fluid passage 356 is exhausted through the fluid passage 226 to release the engagement of the low reverse brake 32 thereby achieving the speed shift to the 2nd speed ratio.

During the above speed shift from the 1st speed ratio to the 2nd speed ratio, the initial hydraulic pressure $P_1$ to be supplied to the kickdown brake 30 after the generation of the shift starting signal is set and the feedback control of the rate of supply of the hydraulic pressure to the kickdown brake 30 is made according to a flow chart programmed in the electronic control device 112. Such a flow chart is shown in FIG. 3(a).

Referring to FIG. 3(a) the electromagnetic valves 108 and 110 are changed over as described above when the shift starting signal is generated from the electronic control device 112 in the step (1). In the step (2), the electromagnetic valve 106 is duty-controlled to operate with a predetermined duty ratio $d_s$ (of, for example, 40.2%) for a predetermined period of time (of, for example, 0.1 to 0.2 seconds), thereby regulating the signal hydraulic pressure downstream of the orifice 214 in the fluid passage 212. Thus, the hydraulic pressure supplied to the fluid chamber 366 of the kickdown brake 30 through the fluid passage 238, the 1st–2nd speed shift valve 100 and the fluid passage 364 is controlled. Such a fluid pressure control is required so that the piston of the kickdown brake 30 can be quickly moved from the initial position shown in FIG. 2 to a position where the brake band is ready to make engagement with the kickdown drum 52. That is, the length of time required for the so-called ineffective stroke of the piston is shortened to shorten the length of time required for the 1-2 speed shift.

Then, in the step (3), the opening $\theta_t$ of the throttle valve is detected on the basis of the output signal of the sensor 138. In the step (4), an initial duty ratio $d_1$ corresponding to the detected throttle valve opening $\theta_t$ is selected from among many initial duty ratios which are stored in the memory in a relation corresponding to associated throttle valve openings. The electromagnetic valve 106 continues to operate with the duty ratio $d_1$ thus determined and commanded, and the initial hydraulic pressure $P_1$ for starting effective engagement of the kickdown brake 30 is supplied to the fluid chamber 366 of the kickdown brake 30 in the initial stage of the speed shift. As described already, the specific automatic transmission is not adapted to meet the factor such as the displacement or the output torque of the engine 2. Therefore, immediately after the vehicle is assembled, that is, when the speed ratio is initially shifted after the vehicle is assembled, the initial hydraulic pressure $P_1$ is higher than the predetermined initial hydraulic pressure to be supplied to this specific automatic transmission (or lower when the relation between the engine and the automatic transmission is contrary to the above case), and the initial hydraulic pressure $P_1$ is corrected during succeeding speed shifts as described hereinunder so that it equals the predetermined initial hydraulic pressure.

When the kickdown brake 30 started to be effectively engaged as a result of the supply of the initial hydraulic pressure $P_1$ described above, the rotation speed of the kickdown drum 52 starts to be decreased and the 1st speed ratio is released. In the step (5), the rotation speed of the kickdown drum 52 and the vehicle speed are detected on the basis of the output signals of the rotation speed sensors 142 and 144 respectively, and, in the step (6), judgment is made as to whether or not the 1st speed ratio has been released on the basis of the relation between the rotation speed of the kickdown drum 52 and the vehicle speed. When the result of judgment in the step (6) is "NO", it indicates that the initial hydraulic pressure $P_1$ is too low. In the step (7), on the basis of the detected throttle valve opening $\theta_t$ and the detected vehicle speed, the decrement of the duty ratio per unit time is computed and determined for decreasing the duty ratio $d_t$. In the step (8), the duty ratio is computed on the basis of the result of determination in the step (7), and a command signal commanding the decreased new duty ratio is applied to the electromagnetic valve 106 to increase the initial hydraulic pressure $P_1$. [Refer to the arrow A in FIG. 5(b).]

The steps (5), (6), (7) and (8) described above are repeated until the 1st speed ratio has been released. When the result of judgment in the step (6) proves that the release of the 1st speed ratio has been achieved, this means that the effective speed shift has been started. In the step (9), a predetermined reference rate of change of the rotation speed of the kickdown drum 52, variable depending on the speed ratio and driving condition of the vehicle, is determined. That is, the rate of change of the rotation speed of the kickdown drum 52 when the hydraulic pressure supplied to its fluid chamber 366 increases at the optimum rate (that is, without giving rise to an engaging shock, an excessively large slip, etc. of the kickdown brake 30) is determined depending on the driving condition of the vehicle. In the step (10), the actual rate of change of the rotation speed of the kickdown drum 52 is computed on the basis of the detected rotation speed of the kickdown drum 52. In the step (11), the deviation of the actual rate of change of the rotation speed of the kickdown drum 52 from the reference rate described is computed, and in the step (12), the required amount of correction of the duty ratio for cancelling the deviation is computed. In the step (13), a new duty ratio based on the result of computation in the step (12) is computed, and a command signal commanding the new duty ratio is applied to the electromagnetic valve 106, thereby changing the hydraulic pressure supplied to the fluid chamber 366 of the kickdown brake 30. Thus, in order that the actual rate of change of the rotation speed of the kickdown drum 52 [shown by the dotted curve in FIG. 5(c)] which initially deviates greatly from the reference rate [shown by the solid curve in FIG. 5(c)] can follow up the reference rate until finally the former coincides with or approximates to the latter, the hydraulic pressure supplied to the fluid chamber 366 of the kickdown brake 30 is feedback-controlled so that the kickdown brake 30 can be engaged at the optimum rate.

In the step (14), the rotation speed of the kickdown drum 52 and the speed of the vehicle are detected. In the step (15), judgment is made as to whether or not the actual rotation speed of the kickdown drum 52 has reached a predetermined rotation speed $N_d$ in the final state of the speed shift when the actual rate of change of the rotation speed of the kickdown drum 52 coincide with or approximates to the desired change rate. (The value $N_d$ represents, for example, a rotation speed reached after attainment of 70% to 80% of the entire rotation-speed changeable range $N_d$ of the kickdown drum 52 or a predetermined low rotation speed reached immediately before being halted.) When the result of judgment in the step (15) is "No", judgment is made in the step (16) as to whether or not the rotation speed of the kickdown drum 52 is "0" rpm, that is, whether or not the kickdown drum 52 is now halted. Since, at this time, the kickdown drum 52 is not halted, the aforementioned feedback control including the steps (9) to (16) is repeatedly executed.

On the other hand, when the result of judgment in the step (15) is "YES", the duty ratio $d_2$ corresponding to the hydraulic pressure $P_2$ supplied to the kickdown brake 30 at this time is detected in the step (17), and in the step (18), the magnitude of the throttle valve opening $\theta_t$ detected in the step (3) is judged. In the step (19), on the basis of the valve of the throttle valve opening t detected in the step (3) and the value of the duty ratio $d_2$ detected in the step (17), the duty ratio $d_1$ corresponding to the initial hydraulic pressure to be primarily supplied to the kickdown brake 30 immediately after the starting of the speed shift is computed according to the throttle valve opening $\theta_t$.

Figure 4:
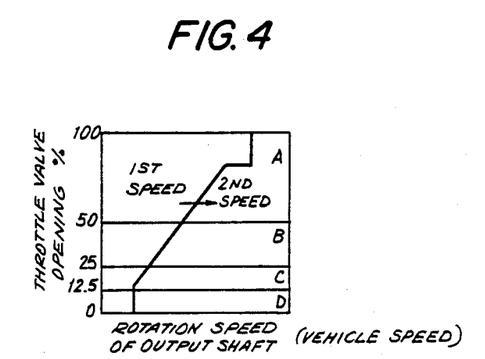
FIG. 4 is a diagram showing the plurality of regions of the throttle valve relative to the transmission shift pattern.

For the purpose of this computation, the throttle valve opening $\theta_t$ is divided into four regions, A, B, C and D as shown in FIG. 4. Constants k and l experimentally determined are allotted to the individual regions. (C Constants k1 to k4 are allotted to the regions D to A respectively, and constants $l_1$ to $l_4$ are allotted to the regions D to A respectively.) In the region to which the detected throttle valve opening $\theta_t$ belongs, the duty ratio $d_1$ is computed according to a formula $d_1 = (k \cdot \theta_t + l) d_2$, using the throttle valve opening $\theta_t$ as a variable.

After the computation of the duty ratio $d_1$ in the step (19), whether or not the kickdown drum 52 is halted is judged in the step (16) again. When the result of judgment in the step (16) is "NO", the feedback control starting from the step (9) is repeated again. However, in this feedback control, the steps (17), (18) and (19) are not executed again since the rotation speed of the kickdown drum 52 judged in the step (15) is not equal to $N_d$ (but is lower than $N_d$). When the halting of the kickdown drum 52 is confirmed in the step (16), a command signal commanding holding of the final duty ratio for a predetermined period of time (of, for example, 0.1 second) is generated in the step (20). Upon lapse of the predetermined period of time above described, a command signal commanding de-energization of the electromagnetic valve 106 (that is, decreasing the duty ratio to 0%) is generated to complete the 1-2 speed shift.

Figure 5A:
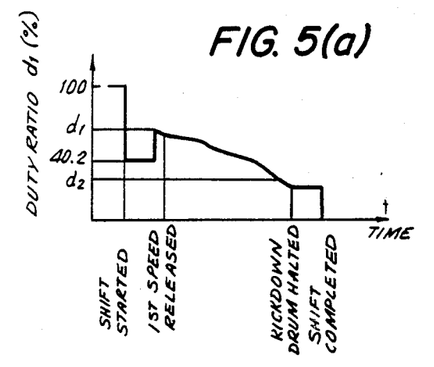
FIGS. 5(a), 5(b), 5(c), and 5(d) are graphs showing the duty ratios, the hydraulic pressure supplied to the kickdown brake, the rotation speed of the kickdown brake, and the torque of the output shaft, relative to the time required for shifting, respectively.
Figure 5B:
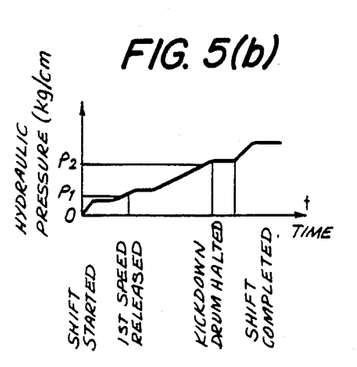
Figure 5C:
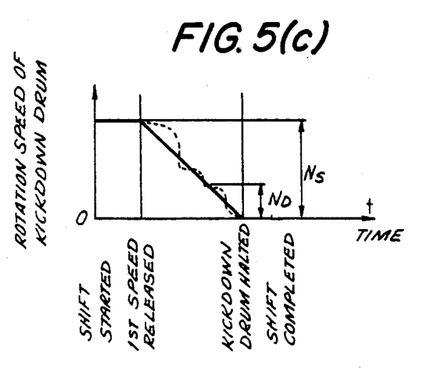
Figure 5D:
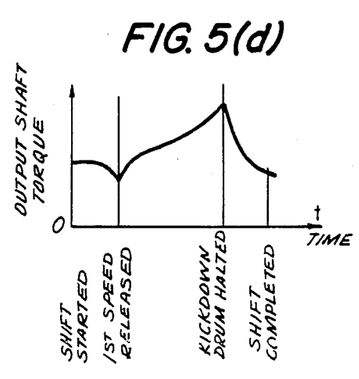

FIG. 5(a) shows how the duty ratio changes relative to time during the speed shift under the feedback control, FIG. 5(h) shows how the hydraulic pressure supplied to the kickdown brake 30 changes relative to time, and FIG. 5(d) shows how the torque of the output shaft 50 changes relative to time.

It will be seen from the above description that the hydraulic pressure determined by the duty ratio $d_1$ computed in the step (19) of the flow chart shown in FIG. 3(a) is used as the initial hydraulic pressure to be supplied during the next speed shift, so that the hydraulic pressure which coincides with or approximates to the initial hydraulic pressure to be primarily supplied and which meets the capacity of the engine 2 can be supplied during the next speed shift. More precisely, the rate of change of the rotation speed of the kickdown drum 52 in the final state of the speed shift coincides with or approximates to the reference rate indicative of the optimum speed shift mode in the specific automatic transmission, so that, in the final state of the speed shift, the value of the hydraulic pressure $P_2$ supplied to the fluid chamber 366 of the kickdown brake 30 is optimum or substantially optimum for the automatic transmission. (In the present embodiment, the final stage of the speed shift refers to the time where a speed change corresponding to 70% to 80% of the entire rotation speed changeable range $N_s$ of the kickdown drum 52 has been attained or the rotation speed of the kickdown drum 52 has reached a predetermined value $N_d$ immediately before being halted.) Thus, when the duty ratio $d_1$ corresponding to the initial hydraulic pressure $P_1$ to be supplied to the kickdown brake 30 immediately after the starting of the speed shift is computed on the basis of the duty ratio $d_2$ corresponding to the hydraulic pressure $P_2$, the hydraulic pressure $P_1$ thus computed can be made optimum or substantially optimum as the initial hydraulic pressure to be supplied in the initial state of the speed shift by the specific automatic transmission. Therefore, the initial hydraulic pressure supplied during the next speed shift can be made equal or closer to the hydraulic pressure to be primarily supplied than in the case of the previous speed shift, and, by repeating the above manner of corrective control for each of individual speed ratios and driving conditions, the specific automatic transmission can be adapted to operate with the engine 2 of the different capacity such as the different output torque or different displacement. Further, since the aforementioned feedback control is continuously carried in the later speed shifts even after the primary initial hydraulic pressure $P_1$ has been achieved, the speed shifts can be satisfactorily done without giving rise to a shift shock or an excessively large slip.

According to the present invention, there is utterly no need to attempt the speed shift at an interval of, for example, 1% of the entire range of the throttle valve opening $\theta_t$ (0% $\leq \theta_t \leq$ 100%) for the purpose of correction of the hydraulic pressure to be supplied in the initial state of the speed shift. According to the present invention, it is merely required to attempt the speed shift at least once in each of the regions A to D of the throttle valve opening $\theta_t$. By doing so, the initial hydraulic pressure to be supplied in the initial state of a speed shift in each region of the throttle valve opening $\theta_t$ can be corrected. More precisely, the optimum constants k and l are experimentally determined for each of the four regions A to D of the throttle valve opening $\theta_t$, and these constants k and l are used to compute the initial hydraulic pressure $P_1$ (corresponding to the duty ratio $d_1$) on the basis of the terminative hydraulic pressure $P_2$ (corresponding to the duty ratio $d_2$). Therefore, when the initial hydraulic pressure is corrected at least once for each of the four regions A to D of the throttle valve opening $\theta_t$, that is, when the initial hydraulic pressure is corrected at least four times for the entire range of the throttle valve opening $\theta_t$ of 0% to 100%, the initial hydraulic pressure can be set to coincide with or approximate to the primary value during the speed shift from the 1st to the 2nd speed ratio. Thus, even when such corrective control of the setting of the initial hydraulic pressure is attempted for each of individual speed shifts, the specific automatic transmission can be adapted to operate with the engine 2 of the different capacity by a small total number of attempts.

It is apparent that the above attempt is repeated automatically with the running of the vehicle so that the initial hydraulic pressure can be made closer or equal to the value of the hydraulic pressure to be primarily supplied.

Figure 3B:
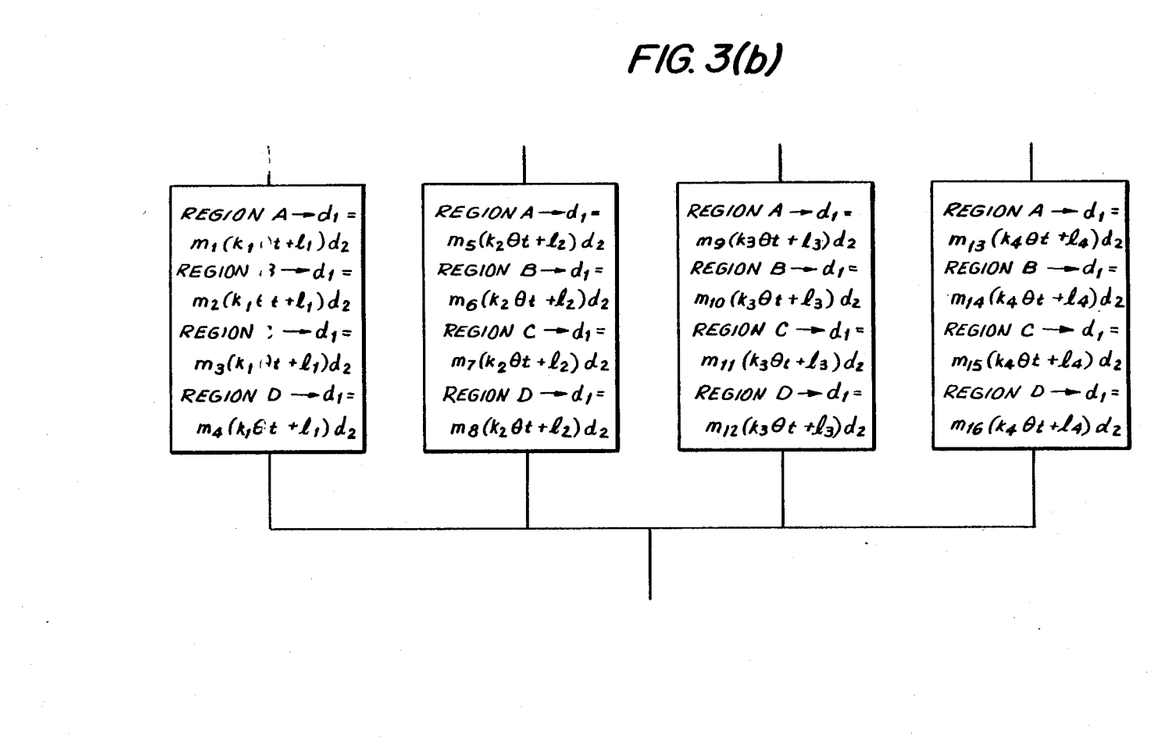
FIG. 3(b) is a flow chart showing a partial modification of the flow chart shown in FIG. 3(a).

FIG. 3(b) is a part of a flow chart showing a modification (another manner of computation) of the flow chart shown in FIG. 3(a). FIG. 3(b) corresponds to the step (19) in FIG. 3(a). Therefore, this modification differs only from the flow chart of FIG. 3(a) in the manner of corrective control for setting of the initial hydraulic pressure, and the description of other similar portions is unnecessary.

Referring to FIG. 3(b), a conversion constant m ($m_1$ to $m_{16}$) correlating the regions A to D of the throttle valve opening $\theta_t$ is provided besides the constants k and l. The duty ratio $d_1$ corresponding to the optimum value of the initial hydraulic pressure is computed according to a formula $d_1 = m \cdot (k \cdot \theta_t + l) d_2$, where the throttle valve opening $\theta_t$ is a variable. Four conversion constants m are provided for each of the regions A to D for correlating these regions A to D, and, there are a total of sixteen conversion constants m. For example, when the 1st to 2nd speed shift is done at a throttle valve opening $\theta_t$ ($25\% \leq \theta_t \leq 50\%$) belonging to the region B, the duty ratio $d_1$ is computed according to the formula $d_1 = m_{10} \cdot (k_3 \cdot \theta_t + l_3) d_2$ in this region B. On the basis of the above result, the duty ratios $d_1$ in the other regions are computed in a proportional relation along the shift pattern shown in FIG. 4. That is, the duty ratio $d_1$ in the region A is computed according to the formula $d_1 = m_9 \cdot (k_3 \cdot \theta_t + l_3) d_2$, the duty ratio $d_1$ in the region C is computed according to the formula $d_1 = m_{11} \cdot (k_3 \cdot \theta_t + l_3) d_2$, and the duty ratio $d_1$ in the region D is computed according to the formula $d_1 = m_{12} \cdot (k_3 \cdot \theta_t + l_3) d_2$.

Therefore, when the speed shift is once at a throttle valve opening $\theta_t$ regardless of the regions A to D, the initial hydraulic pressure is corrected in the entire range of the throttle valve opening $\theta_t$ ($0\% \leq \theta_t \leq 100\%$) so that the specific automatic trransmission can be adapted to operate with the engine 2 of the different capacity by a number of speed-shift attempts less than that in the case of the flow chart shown in FIG. 3(a).

The formulas used in the embodiment for computing the initial hydraulic pressure $P_1$ are merely an example, and it is apparent that the initial hydraulic pressure $P_1$ can be suitably set according to any other formulas, and methods experimentally determined.

Further, although the throttle valve opening is divided into four regions for the purpose of control in the aforementioned embodiment, the number of regions and the mode of division are in no way limited to those described above and may be suitably selected depending on the factors including the speed shifting characteristic of the automatic transmission and the design of the vehicle. That is, the number of regions should be suitably determined taking into consideration the fact that, although an increase in the number of regions and an increase in the number of kinds of constants allotted to the individual regions can effect more delicate correction of the initial hydraulic pressure, the number of speed shift trials increases inevitably on the other hand.

The aforementioned embodiment has specifically referred to the speed shift from the 1st to the 2nd speed ratio. However, in the case of other speed shifts, the feedback control and the correction of the initial hydraulic pressure are similarly made, by selecting suitable frictional engaging elements to which the hydraulic pressure is supplied at a specific speed shift. Further, in the aforementioned embodiment, the rotatable element, which is the object of detection, is the kickdown drum 52 which is repeatedly halted and rotated by the function of the kickdown brake 30 repeatedly engaged and released with the successive speed shifts as shown in Table 1, and the single sensor 142 can serve the purpose of feedback control over all the speed shifts. However, the object of detection may be a rotatable element operating during a specific speed shift only or the rotation speed of the input shaft 20 or the crankshaft 4 of the engine 2. Further, in the aforementioned embodiment, the time when the speed change corresponding to 70% to 80% of the entire rotation speed changeable range $N_s$ of the kickdown drum 52 is referred to as the final state of the 1st to 2nd speed shift, and the corresponding hydraulic pressure $P_2$ is used for the computation of the initial hydraulic pressure $P_1$. However, when the speed change falls within 50% to 100% of the entire rotation speed changeable range $N_s$ due to progressive convergence of the speed change rate to the predetermined reference rate as a result of the feedback control, the initial hydraulic pressure $P_1$ can be similarly computed.

We claim:

1. In an automatic transmission gear system for a vehicle which includes a rotatable element and an engageable element hydraulically operated to change the rotation speed of said rotatable element at the time of a shift from one speed ratio to another and in which a hydraulic pressure to be supplied to said engageable element during a shift is feedback-controlled so that the rate of change of the hydraulic pressure converges to a predetermined reference rate, a method of regulating an initial hydraulic pressure to be supplied to said engageable element at the time of a shift by calculating, on the basis of a value corresponding to a terminative hydraulic pressure being supplied to said engageable element in a terminative stage of a current shift, a value corresponding to an initial hydraulic pressure to be supplied to said engageable element in an initial stage of a next shift participated by said engageable element, said method comprising the steps of:

instructing starting the current shift;

calculating a value on the basis of a value corresponding to a terminative hydraulic pressure having been supplied to said engageable element in a terminative stage of the preceding shift participated by said engageable element and supplying an initial hydraulic pressure corresponding to the calculated value to said engageable element in an initial stage of the current shift;

executing the hydraulic pressure feedback control;

detecting a value corresponding to a terminative hydraulic pressure being supplied to said engageable element in a terminative state of the current shift; and calculating, on the basis of the detected value, a value corresponding to an initial hydraulic pressure to be supplied to said engageable element in an initial stage of the next shift and storing the calculated value in a memory.

2. A method of regulating an initial hydraulic pressure according to claim 1, wherein the hydraulic pressure supplied to said engageable element is controlled by the combination of an electromagnetic valve disposed in a hydraulic circuit communicating with an actuator actuating said engageable element and capable of opening and closing said hydraulic circuit and an electronic control device generating a duty signal energizing said electromagnetic valve.

3. The method of claim 1, including the steps of employing a calculating formula expressed as $$d_1 = (k\theta_s + l).d_2$$

when $d_1$ stands for the duty ratio corresponding to said initial hydraulic pressure, $d_2$ for the duty ratio corresponding to said terminative hydraulic pressure, $\theta_t$ for opening degree of the throttle valve, k and l for constants provided in each of the regions.

4. The method of claim 2, employing a calculating formula expressed as $$d_1 = m.(k\theta_t + l).d_2$$

when $d_1$ stands for the duty ratio corresponding to said initial hydraulic pressure, $d_2$ for the duty ratio corresponding to said terminative hydraulic pressure, $\theta_t$ for opening degree of the throttle valve, k and l for constants provided in each of the regions, m for the conversion constant provided in each of said regions.

5. A method of regulating an initial hydraulic pressure according to claim 2, wherein the value of the hydraulic pressure to be supplied to said engageable element in the initial stage of the next shift is calculated by said electronic control unit on the basis of the value corresponding to the hydraulic pressure being supplied to said engageable element in the terminative stage of the current shift and depending on the operating conditions of the vehicle.

6. The method of claim 5, including the further steps of:

deriving a signal representative of the degree of opening of a throttle of an internal combustion engine associated with said automatic transmission gear system, and, supplying that signal to said electronic control device as a parameter for use in determining the next duty ratio of operation of said actuator dictated by said electronic control device.

7. The method of claim 6, including the steps of dividing the permitted extent of throttle opening into multiple ranges representative of the extent of throttle openings;

supplying a signal to said electronic control device representative of the specific range of throttle opening sensed within said multiple ranges;

providing said electronic control device with a number of conversion constants equal in number to the ranges in said multiple ranges; and, deciding from the specific signal received by said electronic control device an appropriate duty ratio for operation of said actuator.

* * * * *